United States Patent [19]

Hondermark

[11] 3,738,488
[45] June 12, 1973

[54] PROCESSES AND APPARATUS FOR THE RECOVERY OF MICRO-ORGANISMS CULTIVATED ON A HYDROCARBON SUBSTRATE

[75] Inventor: Jean Claude Hondermark, Lavera, France

[73] Assignee: The British Petroleum Company Limited, London, England

[22] Filed: Oct. 2, 1970

[21] Appl. No.: 77,442

[52] U.S. Cl.......................... 210/73, 210/83, 195/74
[51] Int. Cl............................................. B01d 21/26
[58] Field of Search .......................... 195/72–74, 77; 210/59, 60, 63, 73, 83, 84

[56] References Cited
UNITED STATES PATENTS 1,201,062  10/1916  Lavedan ........................... 195/74 X
3,186,922  1/1965  Champagnat ..................... 195/74 X
3,442,802  5/1969  Hamilton et al. ..................... 210/63

Primary Examiner—John Adee
Attorney—Morgan, Finnegan, Durham & Pine

[57] ABSTRACT

A process and apparatus for use in the recovery of a micro-organism cultivated on a hydrocarbon substrate. The feature of the process and apparatus being the provision of a settling zone wherein the aerated cultivated broth containing the micro-organism undergoes a phase separation and a relatively dense fraction containing spent aqueous medium is removed. The remaining aerated fraction is then subjected, in the presence of a wetting agent, to foam breaking agitation, preferably provided by the action of a rotating paddle. The de-aerated broth fraction thus obtained can then be centrifuged in the normal industrial centrifuges to separate a micro-organism rich product.

4 Claims, 1 Drawing Figure

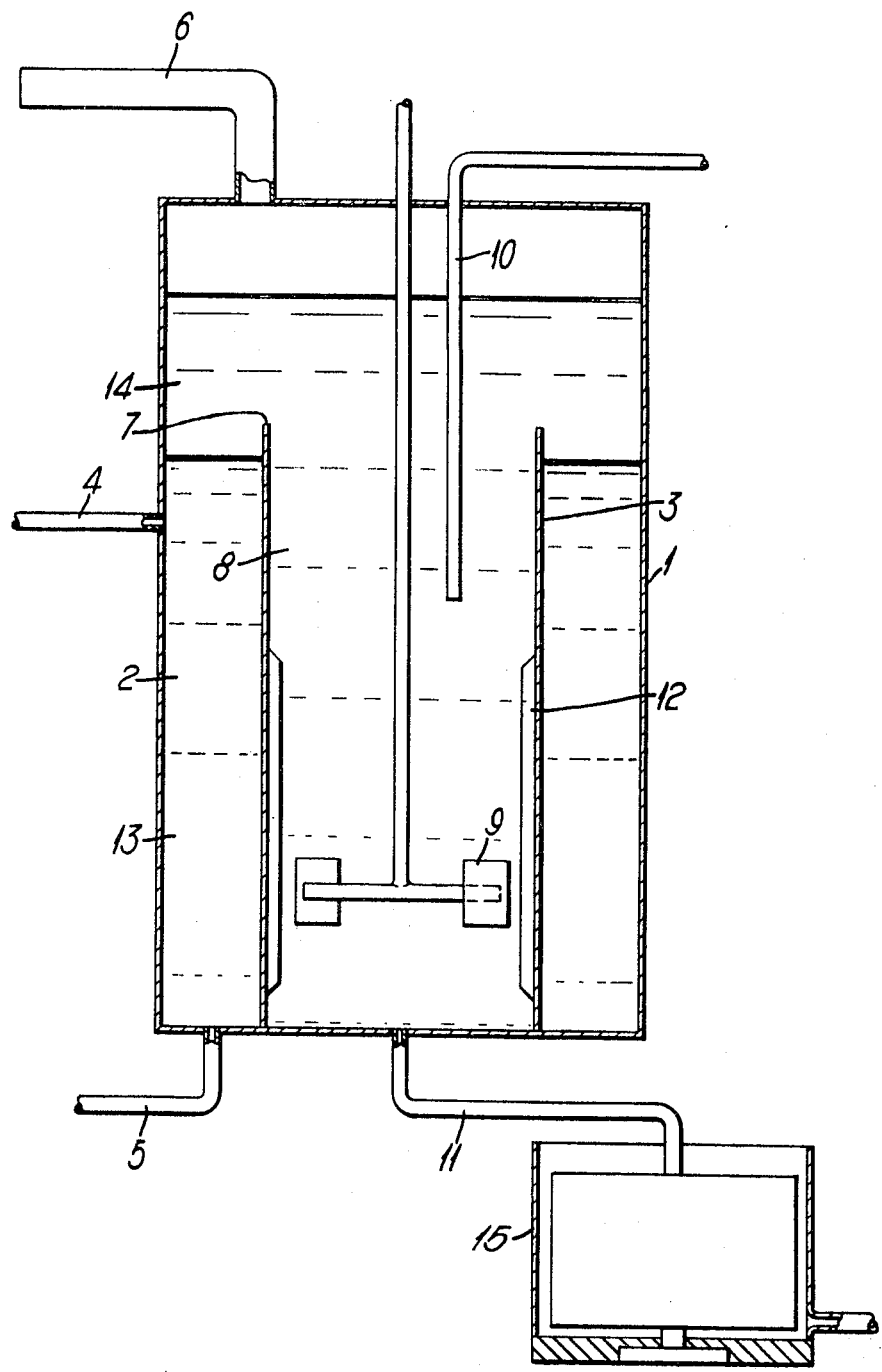

PROCESSES AND APPARATUS FOR THE RECOVERY OF MICRO-ORGANISMS CULTIVATED ON A HYDROCARBON SUBSTRATE

This invention relates to a process for use in the recovery of micro-organisms cultivated on a hydrocarbon substrate and apparatus therefor.

Traditional processes for the recovery of micro-organisms from cultivated fermentation broths in which the primary carbon source is a carbon and oxygen containing compound, e.g. glucose, usually include either a filtration or centrifugation step. Considerable difficulty has been experienced when attempting to use a centrifugation step in processes for the recovery of micro-organisms from fermentations in which hydrocarbons are used as the primary carbon source. The relatively high degree of aeration and agitation required by hydrocarbon fermentations gives a cultivated broth which contains a considerable amount of gas in the form of a foam. Attempts to recover a concentrated micro-organism containing fraction from such foamed broths by centrifugation using the centrifuges which are normally applied industrially in the recovery of micro-organisms have given unsatisfactory results. Some improvement in the separation is obtained by the addition of surface active agents to the broth prior to centrifugation. Separation has been further improved by allowing the broth to settle, for example in a decanter, withdrawing part of the denser aqueous phase containing spent nutrient medium and dissolved fermentation products and replacing the withdrawn aqueous phase with fresh "make-up" water prior to centrifuging in the presence of a surface active agent. However it will be appreciated that on industrial scale such a process would involve the use of a considerable volume of make-up water. The use of water in the quantities required in industrial scale operations is undesirable for economic reasons and in addition could create serious difficulty in the location of the plant.

It is an object of the present invention to provide an improved process and apparatus for use in the recovery of micro-organisms form aerated mixtures containing the micro-organism, spent aqueous nutrient medium and residual hydrocarbons, wherein the use of make-up water prior to centrifuging the mixture to recover a micro-organism rich fraction is eliminated.

According to one aspect of the present invention there is provided a process which comprises feeding an aerated mixture, containing a hydrocarbon-grown micro-organism, spent aqueous nutrient medium and at least one hydrocarbon, to a settling zone, separately withdrawing from said settling zone a relatively dense aqueous phase containing spent nutrient medium and a less dense aerated mixture of the remaining constituents, still containing some aqueous nutrient medium, and treating said aerated mixture in the presence of a surface active agent, to foam breaking agitation to give an at least partially de-aerated cream containing micro-organism, aqueous nutrient medium and said hydrocarbon.

Most suitably the process is continuous in which case the aerated mixture is continuously fed to the settling zone and the at least partially de-aerated cream containing the micro-organism surface active agent, aqueous medium and hydrocarbon, is recovered and passed continuously to a centrifuge step.

A convenient way of providing foam breaking agitation is provided by the action of a rotating paddle. However ultra-sonic vibration would also be suitable.

According to another aspect of the invention there is provided apparatus suitable for use in the recovery of micro-organisms cultivated on a hydrocarbon substrate comprising a decanter vessel having a take-off point for the withdrawal of a relatively dense aqueous phase, a degasser vessel having a take-off point for a deaerated cream containing a micro-organism, a weir connecting the decanter and degasser vessels, by which, in use, a less dense foam from the decanter vessel overflows into the degasser vessel, a rotary paddle situated in the degasser vessel and adapted, in use, to break foam in the degasser vessel and a pipe system, by which, in use a surface active agent is fed into the degasser vessel.

According to another aspect of the invention there is provided apparatus suitable for use in the recovery of micro-organisms cultivated on a hydrocarbon substrate comprising a vessel of annular cross-section surrounding an inner vessel of circular cross-section, wall between the vessels constituting a weir by which, in use, foam passes from the annular vessel to the inner vessel, said inner vessel being equipped with a rotary paddle and a pipe system by which, in use, a surface active agent is fed into the inner vessel.

According to another aspect of the invention there is provided a process which comprises continuously cultivating a micro-organism in the presence of an aqueous nutrient medium; a hydrocarbon substrate and a free oxygen-containing gas, said micro-organism being of a strain which consumes said hydrocarbon, recovering a product stream, comprising an aerated mixture containing the micro-organism, spent aqueous nutrient medium and unmetabolized hydrocarbon, continuously feeding said mixture to a settling zone, separately withdrawing from said settling zone spent aqueous nutrient medium and an aerated mixture of the remaining constituents, still comprising some spent aqueous nutrient medium, treating said aerated mixture with a surface active agent, subjecting the treated mixture to foam breaking under the action of a rotating paddle, continuously withdrawing an at least partially de-aerated cream containing the micro-organism, spent aqueous nutrient medium and said hydrocarbon and thereafter subjecting the de-aerated cream to centrifugation to separate a micro-organism enriched product.

Preferably the hydrocarbon substrate used in accordance with the last aspect of the invention hereinbefore described consists at least in part of a straight-chain hydrocarbon.

Usually the straight-chain hydrocarbons will be present in the feedstock according to the invention as paraffins; however, the straight chain hydrocarbons may be present as olefins; also there may be used a mixture containing straight chain paraffins and olefins.

Suitable feedstocks to the process of the invention include kerosine, gas oils and lubricating oils; these feedstocks may be unrefined or may have undergone some refinery treatment, but must contain a proportion of straight chain hydrocarbons in order to fulfil the purpose of this invention. Suitably the petroleum fraction will contain 3–45 percent by weight of straight chain hydrocarbons.

The process of the invention is of particular value for the treatment of petroleum gas oil fractions which contain straight chain hydrocarbons in the form of waxes, since by this aspect of the process a gas oil of improved pour point is obtained while the waxes are converted to a valuable microbial product.

Micro-organisms which are cultivated as herein described may be yeasts, moulds or bacteria. Within the term "micro-organism" used herein we include mixtures of micro-organisms.

Preferably when a yeast is employed this is of the family Cryptococcaceae and particularly of the sub-family Cryptococcoideae however, if desired there may be used, for example, ascosporogeneous yeasts of the sub-family Saccharomycoideae. Preferred genera of the Cryptococcoideae family are Torulopsis (also known as Torula) and Candida. Preferred strains of yeast are as follows.

In particular it is preferred to use the specific stock of indicated reference number; these reference numbers refer to CBS stock held by the Centraal Bureau voor Schimmelcultures, Baarn, Holland; to CMI stock held by the Commonwealth Mycological Institute, Kew, England; and to NCYC stock held by the National Collection of Yeast Cultures, Nutfield, England.

| Specie | Preferred strain |
|---|---|
| *Candida brumptii* | |
| " *catenulata* | |
| " *clausenii* | |
| " *humicola* | |
| " *intermedia* | |
| " *krusei* | |
| " *lipolytica* | CBS No. 2078; No. 599 |
| | CMI No. 93743 |
| | NCYC No. 376; No. 153 |
| " *melibiosi* | |
| " *parapsilosis* | CMI No. 83350. |
| | NCYC No. 458 |
| " *pulcherrima* | |
| " *rugosa* | |
| " *stellatoidea* | |
| " *tropicalis* | NCYC No. 4 |
| " *utilis* | CMI No. 2331 |
| *Debaryomyces kloeckeri* | |
| *Hansenula anomala* | |
| *Pichia guilliermondii* | CBS No. 2084; No. 2031 |
| *Rhodotorula glutinis* | |
| *Torulopsis femata* | |
| " *magnoliae* | |

Of the above *Candida lipolytica* and *C. tropicalis* are particularly preferred.

If desired the micro-organism may be a mould. Suitable moulds are of the family Moniliaceae; a suitable genus is Penicillium and preferably there is used *Penicillium expansum*. Another suitable genus is Aspergillus.

If desired the micro-organism may be a bacterium. Suitably the bacteria are of one of the orders:
Pseudomonadales, Eubacteriales and Actinomycetales.

Preferred species are *Bacillus megaterium*, *Bacillus subtilis* and *Pseudomonas aeruginosa*.

A suitable nutrient medium for yeasts and moulds has the compsition:

| | |
|---|---|
| Diammonium phosphate | 20 grams |
| Potassium chloride | 11.5 grams |
| Magnesium sulphate 7H$_2$O | 6.5 grams |
| Zinc sulphate | 1.7 grams |
| Manganese sulphate 1H$_2$O | 0.45 gram |
| Ferrous sulphate 7H$_2$O | 0.68 gram |
| Tap water | 200 grams |
| Distilled water (to make up to 1000 mls). | |

Preferably therefore the aqueous nutrient medium is maintained at a desired pH by the step-wise or continuous addition of an aqueous medium of high pH value. Usually, when using moulds or yeasts and in particular when using *Candida lipolytica*, the pH of the nutrient medium will be maintained in the range 3-6 and preferably in the range 4-5. (Bacteria require a higher pH usually 6.5-8). Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25°-35°C. When using *Candida lipolytica* the preferred temperature range is 28°-32°C.

The take-up of oxygen is essential for the growth of the micro-organism. The oxygen will usually be provided as air. In order to maintain a rapid rate of growth, the air, used to provide oxygen, should be present in the form of fine bubbles under the action of stirring. The air may be introduced through a sintered surface. However there may be used the system of intimate aeration known as "vortex aeration".

The product from the fermenter is preferably decanted under conditions such that a major proportion of the aqueous nutrient medium is removed and the decanted fraction containing micro-organism, at least some spent aqueous nutrient medium and unmetabolized hydrocarbon is then treated by the process of the present invention.

The concentrated micro-organism containing product, which is recovered after centrifuging the deaerated cream in accordance with the present process may be further purified to remove residual spent aqueous nutrient medium, hydrocarbons and lipids. Suitable purification processes are known in the art and as examples of two such processes reference is made to British Patents numbered 1,049,066 and 1,049,067.

The process and apparatus according to the present invention are further illustrated with reference to the following example.

Example

A product stream comprising an aerated mixture containing the yeast *Candida tropicalis*, spent aqueous nutrient medium and residual gas oil and having a denisity of 0.65 was continuously withdrawn from a fermenter vessel at the rate of 4,000 kilograms per hour. The product stream was passed to a settling zone 2 of the apparatus shown in the accompanying drawing.

The apparatus consists of a decanter vessel 1 which surrounds an inner degasser vessel 3. The annular space formed between the vessels defines the settling zone 2.

The decanter vessel 1 is provided with a fermenter product stream intake pipe 4 and an off take pipe 5 for the withdrawal of spent aqueous nutrient medium. It is also provided with an vent pipe 6 to allow the gas liberated when the fermenter product stream is defoamed to escape.

The settling zone 2 is in communication with the interior of degasser vessel 3 by way of a weir 7 defined by the top edges of vessel 3. The interior of vessel 3 forms a degassing zone 8 in which are situated a rotary paddle 9 and a pipe 10 through which wetting agent can be supplied. The degasser vessel 3 has at its base an off take pipe 11 for the withdrawal of degassed cream containing the micro-organism. Baffles 12 are provided on the walls of the degasser vessel to assist in agitating the mixture during defoaming.

The product stream from the fermenter separates in the settling zone 2 into a lower relatively dense phase 13 consisting in the main of spent aqueous nutrient medium and an upper less dense phase 14 which consists of a highly aerated mixture containing the product yeast, Candida tropicalis, residual gas oil and some spent nutrient medium.

The upper and lower phases separate in the approximate proportions by weight of 32 and 62 percent respectively in relation to the total weight of the original product stream fed to the settling zone.

The less dense aerated mixture which is in the form of a foam passes over the weir 7 into degassing zone 8 where wetting agent is added through pipe 10 at the rate of about 1 gram per liter calculated on the flow rate of the incoming mixture. The aerated mixture containing the wetting agent is subjected to the agitation effect produced by paddle 9, rotating at a speed of about 1,000 revolutions per minute in combination with baffles 12, set in the side walls of the degasser vessel. The agitation thus produced effectively deaerates the mixture. Deaerated mixture having a density of 0.90 is withdrawn from the degassing zone through off take pipe 11 and fed to a centrifuge 15 stage at the rate of 1,280 kilogram per hour. The deaerated mixture is subjected in the centrifuge to a force of 9,000g which separates the yeast from the mixture at the rate of 230 kilograms (dry weight) per hour.

By way of comparison it was not possible to separate the yeast from the product stream passed directly from the fermenter to the centrifuge even after the stream has been treated with wetting agent before centrifuging. By way of a further comparison the product stream was pre-treated by way of decantation to remove about 65 percent of the spent aqueous medium followed by addition of an equal volume of make-up water to replace the decanted medium, and then admixed with wetting agent. The treated mixture having a density of approximately 0.65 centrifuged at a force of 9,000g gave a less satisfactory separation of yeast than that obtained when the product was pretreated in accordance with the present process.

I claim:

1. A process for the recovery of micro-organisms cultivated on a hydrocarbon substrate which comprises feeding an aerated mixture containing a hydrocarbon-grown micro-organism, spent aqueous nutrient medium and at least one hydrocarbon, to a settling zone, wherein the mixture separates into an aerated phase and a partially deaerated phase, the aerated phase moving upwardly in the settling zone under the action of the differential density between the aerated and partially deaerated phase, separately recovering from said settling zone the relatively dense aqueous phase containing mainly spent nutrient medium and the less dense aerated phase containing mainly the micro-organism with some hydrocarbon and spent aqueous nutrient medium, and treating said aerated phase in the presence of a surface active agent to foam breaking agitation to give an at least partially deaerated cream.

2. A process according to claim 1 in which foam breaking agitation is provided by the action of a rotating paddle.

3. A process as claimed in claim 1 wherein the micro-organism is a hydrocarbon consuming yeast.

4. A process as claimed in claim 1 wherein the deaerated cream is subjected for centrifugation whereby a micro-organism rich product is separated from the remaining constituents of the cream.

* * * * *